United States Patent Office 3,381,023

Patented Apr. 30, 1968

3,381,023

PREPARATION OF AROMATIC GROUP VI-B METAL TRICARBONYLS

Mark Crosby Whiting, Oxford, England, assignor to Ethyl Corporation, New York, N.Y., a corporation of Virginia No Drawing. Filed Mar. 10, 1958, Ser. No. 720,083
31 Claims. (Cl. 260—429)

This invention relates to a process for the preparation of organometallic compounds and more particularly the preparation of aromatic Group VI-B transition metal carbonyl compounds.

Recently a method for the preparation of aromatic chromium tricarbonyl compounds has been proposed, which method comprises the equilibration, in an aromatic solvent of a di-aromatic chromium compound with chromium hexacarbonyl and which employs a reaction time of 12 hours under pressure at temperature in excess of 200° C. In order to accomplish this preparation, it is first necessary to prepare di-benzene chromium itself, which is a complex and inefficient process.

It is, therefore, an object of this invention to provide a novel method for the preparation of aromatic Group VI-B transition metal carbonyl compounds. A further object is the preparation of aromatic chromium tricarbonyl compounds which does not first require the preparation of a di-aromatic chromium compound. Other objects will be apparent from the following description.

The above and other objects are accomplished by a process for preparing an aromatic Group VI-B transition metal carbonyl coordination complex which comprises reacting a Group VI-B transition metal carbonyl with an aromatic compound. It has now been found that this preparation may be accomplished in a system where the only reactants are the Group VI-B transition metal carbonyl and the aromatic compound. When desired, the reaction can be conducted in a high-boiling solvent.

The process of this invention can be summarized by the following chemical equation in which Ar represents an aromatic compound and M represents a Group VI-B transition metal:

$$Ar+M(CO)_6 \rightarrow ArM(CO)_3+3CO$$

Thus, carbon monoxide is given off as a product of the reaction.

The Group VI-B transition metal carbonyl compounds which are reactants in the process of this invention include chromium hexacarbonyl, molybdenum hexacarbonyl and tungsten hexacarbonyl. A preferred embodiment of this invention comprises the reaction of chromium hexacarbonyl with an aromatic compound to produce an aromatic chromium tricarbonyl. This embodiment is preferred as the compounds prepared are highly useful chemical entities.

As an example of the preferred embodiment of the process of this invention, a suspension of chromium hexacarbonyl in an excess of anisole was heated under reflux in a nitrogen atmosphere until sublimation of the chromium hexacarbonyl had ceased, resulting in a deep yellow-colored solution. This solution was evaporated to dryness under reduced pressure leaving a yellow crystalline residue which comprised a 94 percent yield of anisole chromium tricarbonyl. This compound has a melting point of 86–87° C.

The process of this invention has numerous advantages. It is a simple and straight forward reaction to obtain the desired products. In distinction to previously known methods for making the compounds, it is conducted in a single step beginning with the metal carbonyl. As pointed out above, the previous method involved the initial preparation of a di-aromatic metal compound as an intermediate. Furthermore, the isolation procedures for separating the resulting compounds are simplified by the process of this invention, as a minimum of unreacted starting materials and side products are present in the final composition. In addition, superior yields are obtained. For example, o-cresyl methylether chromium tricarbonyl was prepared in 99 percent yield by the process of this invention. Yields of this order of magnitude have not heretofore been possible.

The temperatures employed in the process of this invention may vary over a wide range. In general, temperatures of from about 100° C. to 300° C. are employed. However, a preferred range of temperature is from 150° C. to 225° C. as the reaction in this temperature range leads to a high yield of products with a minimum of undesirable side reactions.

The aromatic compound which is a reactant in the process of this invention can be selected from a wide range of aromatic organic compounds including mononuclear hydrocarbons, poly-nuclear hydrocarbons, mono and poly-nuclear aromatic amines, aromatic esters, aromatic ethers and phenolic compounds. The applicable aromatic compounds should be free of oxidizing substituents and be less acidic than benzoic acid. Examples, therefore, of the applicable aromatic compounds include phenol, amylbenzoate, propylbenzoate, butylphenyl ether, para-methyl anisole, m-hexylaniline, 2-amino-4-isopropylnaphthalene, N,N-di-methyl-o-methylaniline, 1 - methyl - biphenyl, tetrahydronaphthalene, β-methylnaphthalene, anthracene, phenanthracene, mesitylene, meta-di-methylbenzene, m,m'-di-tert.-butyl-diphenyl and the like. Those aromatic compounds having up to about 20 carbon atoms are preferred since they lead to more easily recoverable products and are, of course, the principal available aromatic compounds. A preferred embodiment of this invention employs an aromatic compound in which the substituents on the benzene nucleus, if any, are not para-oriented. Thus preferred aromatic compounds employed have substituents in the meta or ortho relationship, as it has been found that higher yields of aromatic Group VI-B transition metal carbonyl compounds can be prepared from these reactants.

Whereas the process of the present invention can be conducted at atmospheric pressure at the reflux temperature of the system, higher or lower temperatures and higher pressures may also be conveniently employed. Thus benzene chromium tricarbonyl has been prepared by reaction of benzene with chromium hexacarbonyl in a sealed vessel at 225° C. at the prevailing pressure. In this embodiment of the invention, temperatures of from 150° C. to 250° C. are preferred although temperatures outside this range may also be employed. Since carbon monoxide is given off as a product of this reaction, and an excess of carbon monoxide pressure may inhibit further formation of the desired aromatic Group VI-B transition metal tricarbonyl compound, it is advantageous to vent excess carbon monoxide through a condenser when the process of this invention is conducted at elevated pressures.

A particularly preferred embodiment of this invention comprises reacting under reflux conditions at atmospheric pressure, an aromatic organic compound, as defined above, which contains at least seven carbon atoms with a Group VI-B transition metal carbonyl. It has been found that when the aromatic compound employed has a molecular weight of above 90 it is unnecessary to employ elevated pressures to obtain an excellent yield of an aromatic Group VI-B transition metal tricarbonyl compound. When the aromatic compound employed has a molecular weight of below about 90, it is preferred to conduct the process at slightly elevated pressures as described above, as it has been found that superior yields of the lower molecular weight aromatic Group VI-B transition metal tricarbonyl compounds are formed in this manner.

No solvent is required in conducting the process of this invention, the aromatic compound being employed in excess to serve as a carrier for the Group VI–B transition metal carbonyl. However, it is often convenient to employ an inert diluent in the process. High-boiling saturated hydrocarbons are the preferred solvents. Other solvents which can be employed include higher boiling ethers, high-boiling aliphatic esters, silicone oils, aliphatic polyesters, and other liquids inert to the primary reactants. Examples of the compounds useable as solvents in the process of this invention include n-octane, n-nonane, n-decane and the various iso-decanes and other parafinic hydrocarbons having up to about 20 carbon atoms such as eicosane, octadecane, pentadecane and the like. Ether solvents which may be employed include ethyl octylether, amyl ethyl ether, ethyl heptylether, and ethyl hexylether. Ester solvents which may be employed include pentyl 2-methylpropanoate, pentyl butanoate, butyl butanoate, γ-methylbutyl butanoate, ethyl decanoate, methyl decanoate, pentyl hexanoate, ethyl hexanoate, and the like. Applicable silicone oils include copolymers and homopolymers of the various organosiloxanes and organosilanes having the appropriate boiling range. Examples of these are the dimethyl polysiloxanes, methylphenyl polysiloxanes, diphenyl polysiloxanes, di(chlorophenyl)polysiloxanes, hexaethyldisiloxane, hexapropyl disilane, diethyldipropyldiphenyldisilane and the like. The polyesters applicable as solvents in the process of this invention are completely esterified dicarboxylic acids. Esters may be employed derived from succinic, maleic, pyrotartaric, glutaric, adipic, pimelic, suberic, azelaic, sebacic and pinic acids, specific esters being di(1-methyl-4-ethyloctyl)glutarate, di(2-ethylhexyl)adipate, di(3-methylbutyl)azelate, di(2-ethylhexyl)azelate, di(2-ethylhexyl)sebacate, di(3,5,5-trimethylhexyl)sebacate, di(2-ethylhexyl)maleate, di(methylcyclohexyl)adipate, 2-ethylhexyl-1-methylheptyl sebacate, and the like.

The aromatic Group VI–B transition metal carbonyl compounds prepared by the process of this invention can be recovered by evaporation of the excess aromatic reactant and/or solvent when the product is soluble in the system. In certain cases, the product aromatic metal carbonyl compound is insoluble in the solvent employed, and the compound may be recovered by filtration. The compounds may be purified by recrystallization from hydrocarbons or lower aliphatic ethers.

The following examples, in which all parts and precentages are by weight, are illustrative of the compounds of this invention and their preparation.

Example I

A suspension of 138 parts of chromium hexacarbonyl in 200 parts of anisole was heated under reflux (155° C.) for six hours while the reactants were protected by a stream of nitrogen. The reaction was conducted in a glass reaction vessel fitted with a reflux condenser and heating means. The resulting deep yellow solution was cooled and diluted with 713 parts of ethylether and then filtered. The resulting solution was evaporated to dryness under reduced pressure. One hundred thirty-five parts of yellow crystalline solid were obtained which had a melting point of 86–87° C. after recrystallization from isopropylether. This represents a 94 percent yield of anisole chromium tricarbonyl. Elemental analysis of the compound showed it to contain 49.5 percent carbon and 3.5 percent hydrogen as compared to a calculated content of 49.2 percent carbon and 3.3 percent hydrogen.

Examples II–VIII

Following the basic procedure outlined in Example I above, aromatic chromium tricarbonyl compounds of mesitylene, o-xylene, m-xylene, para-xylene, tetralin, o-cresyl methylether, and para-cresyl methylether were obtained. The details of these preparations are given in Table I. The reactions were all conducted at the reflux temperature of the system. In each instance where the product was analyzed for its elemental constituents, results exceptionally close to the theoretical content were obtained.

TABLE I

| Example | Aromatic Reactant | Reaction Time (Hours) | Product | Melting Point (° C.) | Yield (Percent) |
|---|---|---|---|---|---|
| II | Mesitylene | 4 | Mesitylene chromium tricarbonyl | 177–178 | 86 |
| III | o-Xylene | 6 | o-Xylene chromium tricarbonyl | 90–91.5 | 81 |
| IV | m-Xylene | 6 | m-Xylene chromium tricarbonyl | 107–108.5 | 27 |
| V | p-Xylene | 6 | p-Xylene chromium tricarbonyl | 98–99 | 2 |
| VI | Tetralin | 3 | Tetralin chromium tricarbonyl | 116–117.5 | 84 |
| VII | o-Cresyl methylether | 3 | o-Cresyl methylether chromium tricarbonyl. | 75–77 | 99 |
| VIII | p-Cresyl methylether | 4.5 | p-Cresyl methylether chromium tricarbonyl. | 47–48.5 | 70 |

Example IX

The procedure of Example I was followed employing methyl benzoate and chromium hexacarbonyl. Methyl benzoate chromium tricarbonyl was produced by this reaction.

Example X

A mixture of 21 parts of chromium hexacarbonyl and 38 parts of N,N-dimethylaniline was heated to reflux in 179 parts of decalin (decahydronaphthalene) for 3 hours. The solution was then cooled and made homogeneous with ether, filtered and concentrated to a small volume. A yellow solid precipitated from the solution and was removed by filtration. This solid was N,N-dimethylaniline chromium tricarbonyl which had a melting point of 145.8–146.5° C. after recrystallization from isopropyl ether. Twenty-two and six tenths parts of the compound were recovered representing a 90 percent yield. Analysis showed the compound to contain 51.3 percent carbon and 4.35 percent hydrogen. The calculated content for N,N-dimethylaniline chromium tricarbonyl is 51.35 percent carbon and 4.3 percent hydrogen.

Examples XI–XVII

The procedure of Example X was applied to other aromatic reactants with similar results. The details of these reactions and the products obtained are shown in Table II.

TABLE II

| Example | Aromatic Reactant | Reaction Time (hours) | Product | Melting Point (° C.) | Yield (percent) |
|---|---|---|---|---|---|
| XI | Naphthalene | 2 | Tetralin chromium tricarbonyl [1] | | 66 |
| XII | Aniline | 3 | Aniline chromium tricarbonyl | 173–175 | 91 |
| XIII | o-Toluidine | 1.5 | o-Toluidine chromium tricarbonyl | 130–132 | 98 |
| XIV | m-Toluidine | 1.5 | m-Toluidine chromium tricarbonyl | 137–138.5 | 99 |
| XV | N-methylaniline | 3 | N-methylaniline chromium tricarbonyl | 122.5–124 | 89 |
| XVI | N,N-dimethylaniline | 3 | N,N-dimethylaniline chromium tricarbonyl. | 146–146.5 | 91 |
| XVII | N,N-dimethyl-o-toluidine | 3 | N,N-dimethyl-o-toluidine chromium tricarbonyl. | 76.5–78 | 97 |

[1] Product is essentially the tetralin complex which results from hydrogen transfer from the solvent.

Example XVIII

Following the procedure outlined in Example X, 236 parts of chromium hexacarbonyl and 144 parts of diphenyl were reacted in 225 parts of decalin and the resulting mixture was subsequently diluted with 800 parts of ethyl ether. The solution was concentrated to yield a red oil which was triturated with an equal volume mixture of ether and pentane. The resulting orange powder had a melting point of 171–172° C. Concentration of the remaining filtrate to dryness produced another orange solid having a melting point of 57–63° C. in 87 percent yield. One of the products of this reaction is biphenyl chromium tricarbonyl and the other is cyclohexylphenyl chromium tricarbonyl which results from hydrogen transfer from the decalin solvent to the biphenyl reactant.

Example XIX

Molybdenum carbonyl was reacted in an excess of mesitylene at reflux to give 70 percent yield of mesitylene molybendum tricarbonyl.

Examples XX–XXIV

Following the procedure outlined in Example XVIII, β-methylnaphthalene, α-naphthylamine, β-naphthylamine, phenanthrene, and anthracene were reacted with chromium hexacarbonyl to give substantial yields of the corresponding aromatic chromium tricarbonyl complex. In all these instances, the resulting product was a mixture of isomeric products which result from the fact that the aromatic compound employed is poly-nuclear.

Example XXV

Following the procedure outlined in Example X, phenol was reacted with chromium hexacarbonyl to give an excellent yield of hydroxybenzene chromium tricarbonyl.

Example XXVI

Molybdenum hexacarbonyl (500 parts) was heated at reflux in a mixture of about 3115 parts of mesitylene and 6600 parts of decalin under a nitrogen atmosphere. Refluxing was continued until all gas evolution had ceased. The resultant green solution was cooled and a yellow crystalline solid precipitated. This was filtered and recrystallized from benzene to yield 280 parts of mesitylene molybdenum tricarbonyl. Analysis of the compound showed it to contain 48.2 percent carbon, 4.00 percent hydrogen and 32.0 percent molybdenum. The calculated composition of mesitylene molybdenum tricarbonyl is 48.0 percent carbon, 4.0 percent hydrogen and 32.0 percent molybdenum. The compound was submitted for infrared analysis and showed typical absorption bands for a metallo carbonyl.

Example XXVII

In a pressure resistant vessel equipped with heating means, temperature measuring device and means for charging and discharging gaseous, liquid and solid reactants was placed 110 parts of chromium hexacarbonyl and 870 parts of benzene. The vessel was then sealed and the temperature raised to 250° C. This temperature was maintained for six hours with the charge under 100 p.s.i. of nitrogen pressure. The vessel was then cooled, vented and discharged. Unreacted chromium carbonyl was filtered from the resulting benzene solution and the benzene was removed by evaporation at reduced pressure. Following this the residue was sublimed at two millimeters of mercury pressure and 130° C. The first product to sublime was a small amount of chromium hexacarbonyl following which 16 parts of yellow crystalline benzene chromium tricarbonyl sublimed from the residue. The compound has a melting point of 163–165° C. Analysis showed the compound to contain 24.4 percent chromium. The calculated chromium content for benzene chromium tricarbonyl is 24.3 percent. An infrared spectra indicated that the compound has the assigned structure and showed the evidence of typical absorption bands for a metallo carbonyl.

Example XXVIII

Following the procedure of Example XXVII, tungsten carbonyl is reacted with excess toluene to give a good yield of toluene tungsten tricarbonyl. Excellent results are also obtained when m-xylene is reacted at atmospheric pressure with tungsten carbonyl in ethylhexylether as a solvent at the reflux temperature of the system.

The compounds of the present invention vary insofar as their thermal stability is concerned, but all of them can be decomposed at a temperature above 400° C. The thermal decomposition of the compound results in the formation of metallic mirrors comprising a layer or coating of a particular Group VI–B transition metal. These metallic layers and coatings have useful and desirable properties of electrical conductance, furnish protection against corrosion when they are applied to base materials susceptible to corrosion and likewise have a decorative effect. The compounds of the present invention can also be deposited on glass, glass cloth, resins and other insulating supports, and the resultant metal-coated material can be used as conductors and insulating tapes for electrical applications. The metals can be deposited on the support in the desired proportions by thermal decomposition using classical processes in order to obtain the so-called "printed" electrical circuits. Similarly the metals can be applied to metallic supports to increase the corrosion resistance and on glass or asbestos cloth to obtain decorative metallic surfaces and designs. In order to effect the deposition of the metals by thermal decomposition of the compounds of the present invention, it is preferred to use inert gasses, e.g., argon, as protecting or covering gas in order to reduce to a minimum oxidation by air or oxygen.

Deposition on glass cloth illustrates the applied processes. A glass cloth band weighing 1 gram is dried for one hour in an oven at 150° C. Then together with 0.5 gram of anisole chromium tricarbonyl it is enclosed in a glass tube devoid of air and heated at 400° C. for one hour, after which time the tube is cooled and opened. The cloth has a uniform metallic gray appearance and exhibits a gain in weight of about 0.02 gram. The cloth has a greatly decreased resistivity. Each individual fibre proves to be a conductor. As would be expected, the application of a current to the cloth causes an increase in temperature. Thus, a conducting cloth has been prepared. This cloth can be used to reduce static electricity, for decoration, for thermal insulation by reflection, as protection and as a heating element.

The chemical entities of the present invention can be used to deposit the respective Group VI–B transition elements in the catalytic form on suitable supports. Thus, the compounds of the present invention can be thermally decomposed using elevated temperatures of 250–400° C. or above, preferably in an atmosphere of argon or other inert gas, e.g., krypton, in order to obtain supported Group VI–B transition elements in the catalytically active form. Other classical processes can be used to deposit the metallic catalysts, using the chemical entities according to the present invention. For example, a solution of mesitylene molybdenum tricarbonyl is mixed with infusorial earth, the compound being adsorbed on the infusorial earth. The adsorption product is separated by filtration and heated in air to decomposition temperature of the mesitylene molybdenum tricarbonyl, yielding a catalytically active surface of molybdenum oxide. The catalyst is useful in the refining of petroleum fractions. The catalyst can also be deposited on alumina.

I claim:

1. A process for preparing a carbocyclic aromatic Group VI–B transition metal tricarbonyl compound which comprises reacting a Group VI–B transition metal hexacarbonyl compound with a carbocyclic aromatic compound which is free of oxidizing substituents and is less acidic than benzoic acid in a system where the only reactants are the said Group VI–B transition metal carbonyl and the said aromatic compound.

2. Process of claim 1 where the Group VI–B transition metal carbonyl is chromium hexacarbonyl.

3. Process of claim 1 wherein the reaction is conducted at the reflux temperature of the system.

4. Process of claim 1 wherein the reaction is conducted under pressure at above the reflux temperature of the system.

5. The process for the preparation of benzene chromium tricarbonyl which comprises reacting benzene with chromium hexacarbonyl at 250° C.

6. A process for preparing a carbocyclic aromatic Group VI–B transition metal tricarbonyl compound which comprises reacting a Group VI–B transition metal hexacarbonyl with a carbocyclic aromatic compound which is free of oxidizing substituents and is less acidic than benzoic acid at a temperature ranging from 150 to 225° C. in a system where the only reactants are said Group VI–B transition metal hexacarbonyl and said carbocyclic aromatic compound.

7. The process of claim 6 wherein said carbocyclic aromatic compound contains up to about 20 carbon atoms.

8. Process of claim 7 wherein said carbocyclic aromatic compound contains at least 7 carbon atoms and has a molecular weight in excess of 90.

9. The process of claim 6 wherein the reaction is carried out in the presence of a neutral solvent.

10. The process of claim 6 in which the carbocyclic aromatic compound is selected from the group consisting of carbocyclic aromatic compounds in which the substituent groups are ortho oriented and carbocyclic aromatic compounds in which the substituent groups are meta oriented.

11. The process of claim 6 in which said Group VI–B transition metal hexacarbonyl is chromium hexacarbonyl.

12. The process of claim 2 wherein said carbocyclic aromatic compound is anisole.

13. The process of claim 2 wherein said carbocyclic aromatic compound is o-xylene.

14. The process of claim 2 wherein said carbocyclic aromatic compound is m-xylene.

15. The process of claim 2 wherein said carbocyclic aromatic compound is p-xylene.

16. The process of claim 2 wherein said carbocyclic aromatic compound is tetralin.

17. The process of claim 2 wherein said carbocyclic aromatic compound is o-cresyl methylether.

18. The process of claim 2 wherein said carbocyclic aromatic compound is p-cresyl methylether.

19. The process of claim 2 wherein said carbocyclic aromatic compound is methyl benzoate.

20. The process of claim 2 wherein said carbocyclic aromatic compound is N,N-dimethylaniline.

21. The process of claim 2 wherein said carbocyclic aromatic compound is naphthalene.

22. The process of claim 2 wherein said carbocyclic aromatic compound is aniline.

23. The process of claim 2 wherein said carbocyclic aromatic compound is o-toluidine.

24. The process of claim 2 wherein said carbocyclic aromatic compound is m-toluidine.

25. The process of claim 2 wherein said carbocyclic aromatic compound is N-methylaniline.

26. The process of claim 2 wherein said carbocyclic aromatic compound is N,N-dimethyl-o-toluidine.

27. The process of claim 2 wherein said carbocyclic aromatic compound is diphenyl.

28. The process of claim 2 wherein said carbocyclic aromatic compound is mesitylene.

29. Process for the preparation of mesitylene molybdenum tricarbonyl, said process comprising reacting molybdenum hexacarbonyl with mesitylene.

30. A process comprising reacting a carbocyclic aromatic compound with chromium hexacarbonyl in accordance with the equation $$Ar+Cr(CO)_6 \rightarrow ArCr(CO)_3+3CO$$

wherein Ar represents said carbocyclic aromatic compound.

31. A process comprising reacting a carbocyclic aromatic compound, with a Group VI–B metal hexacarbonyl in accordance with the equation $$Ar+M(CO)_6 \rightarrow ArM(CO)_3+CO$$

wherein Ar represents said carbocyclic aromatic compound and M represents said Group VI–B metal.

References Cited

UNITED STATES PATENTS

| | | | |
|---|---|---|---|
| 2,409,167 | 10/1946 | Veltman | 260—429 X |
| 2,818,417 | 12/1957 | Brown et al. | 260—429 |

OTHER REFERENCES

Z. Anorg. Chem., 221, pp. 337 to 348 (1935).

JACS, vol. 76, Jan. 5, 1954, p. 209.

J. Chem. Soc. (London), February 1958, pp. 642, 643.

Fischer et al.: "Chem. Berichte," #12 (1958), pp. 2763 to 2772.

Fischer et al.: "Chem. Berichte," #11, (1958), pp. 2395 to 2399.

Hallam et al.: "J. Inorganic and Nuclear Chemistry," 1955, vol. 1, p. 313.

Piper et al.: "J. Inorganic and Nuclear Chemistry," 1956, vol. 3, p. 104 and vol. 1, 1955, p. 165. "Quarterly Rev.," vol. IX, No. 4, 1955, p. 408.

TOBIAS E. LEVOW, *Primary Examiner.*

ABRAHAM H. WINKELSTEIN, *Examiner.*

R. S. AULL, H. M. S. SNEED, *Assistant Examiners.*